_(12)_ United States Patent
Jann et al.

(10) Patent No.: US 9,544,002 B2
(45) Date of Patent: Jan. 10, 2017

(54) CONCURRENT TRANSMIT AND RECEIVE

(71) Applicant: Intel IP Corporation, Santa Clara, CA (US)

(72) Inventors: Benjamin Jann, Beaverton, OR (US); Hasnain Lakdawala, San Diego, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/156,674

(22) Filed: Jan. 16, 2014

(65) Prior Publication Data

US 2015/0295611 A1    Oct. 15, 2015

(51) Int. Cl.
| | |
|---|---|
| *H04M 1/00* | (2006.01) |
| *H04B 1/3827* | (2015.01) |
| *H04W 88/02* | (2009.01) |
| *H04W 52/02* | (2009.01) |

(52) U.S. Cl.
CPC ....... *H04B 1/3833* (2013.01); *H04W 52/0274* (2013.01); *H04W 88/02* (2013.01)

(58) Field of Classification Search
CPC ... H04B 1/1638; H04B 7/18513; H04W 52/38
USPC ........................................... 455/571
See application file for complete search history.

(56) References Cited

U.S. PATENT DOCUMENTS

| | | | | |
|---|---|---|---|---|
| 7,593,698 B1* | 9/2009 | Johnson | ................ | H03F 1/0211 |
| | | | | 375/300 |
| 8,565,112 B2* | 10/2013 | Peiris | .................. | H04M 1/7253 |
| | | | | 370/252 |
| 2007/0184782 A1* | 8/2007 | Sahota | .................... | H04B 1/525 |
| | | | | 455/63.1 |
| 2014/0345251 A1* | 11/2014 | McLean | .................. | F03H 99/00 |
| | | | | 60/202 |
| 2015/0146583 A1* | 5/2015 | Yoon | ...................... | H04B 1/525 |
| | | | | 370/278 |

FOREIGN PATENT DOCUMENTS

| | | |
|---|---|---|
| CN | 104796097 A | 7/2015 |
| DE | 102014018771 A1 | 7/2015 |

\* cited by examiner

*Primary Examiner* — Ajibola Akinyemi
(74) *Attorney, Agent, or Firm* — Schwegman Lundberg & Woessner, P.A.

(57) ABSTRACT

The disclosure is directed to a circuit arrangement and method that provide efficient concurrent transmit and receive, transmit only and receive only of wireless signals. In one implementation, a circuit arrangement is provided that incorporates uses a single antenna to achieve concurrent transmit and receive, transmit only and receive only of wireless signals. A dual amplifier structure may be provided, and at least one of the amplifiers associated with the dual amplifier structure is amplitude tunable in order to ensure that each amplifier of the dual amplifier structure provides substantially the same or the same signal amplification. Unwanted transmit signals detected by a receiving circuit arrangement may be used to cause a processor to generate a digital code word that is used to modify a signal amplification provided by at least one of the amplifiers associated with the dual amplifier structure.

17 Claims, 3 Drawing Sheets

CONCURRENT TRANSMIT AND RECEIVE

BACKGROUND

Mobile wireless communications devices today are used for more than voice communications. Indeed, many mobile wireless communications devices today are capable of sending and receiving e-mail, browsing the Internet, executing a variety of applications, and playing media files. Given the ever increasing features present in mobile wireless communications devices, the delineation between them and traditional desktop computers is becoming less pronounced.

In fact, some mobile wireless communications devices today are capable of wireless communications that are not cellular in nature, such as wireless local area network (WLAN) communications and Bluetooth™ communications. While these additional capabilities are desired by users, they place additional requirements on the hardware of the mobile wireless communications devices. For example, to handle these multiple wireless communications types, mobile wireless communications devices typically have additional antennas and additional hardware. These additional antennas and hardware increase the size and weight of the device, as well as add cost the manufacture of the device.

BRIEF DESCRIPTION OF THE DRAWINGS

The detailed description is described with reference to the accompanying figures. In the figures, the left most digit(s) of a reference number identifies the figure in which the reference number first appears. The use of the same reference numbers in different figures indicates similar or identical items.

DETAILED DESCRIPTION

Overview

The disclosure is directed to a circuit arrangement and method that provide efficient concurrent transmit and receive, transmit only and receive only of wireless signals. In one implementation, a circuit arrangement is provided that incorporates a single antenna to achieve concurrent transmit and receive, transmit only and receive only of wireless signals. A dual amplifier structure may be provided, and at least one of the amplifiers associated with the dual amplifier structure is amplitude tunable in order to ensure that each amplifier of the dual amplifier structure provides substantially the same or the same signal amplification. Unwanted transmit signals detected by a receiving circuit arrangement may be used to cause a processor to generate a digital code word that is used to modify a signal amplification provided by at least one of the amplifiers associated with the dual amplifier structure.

Exemplary Structure

Figure 1:
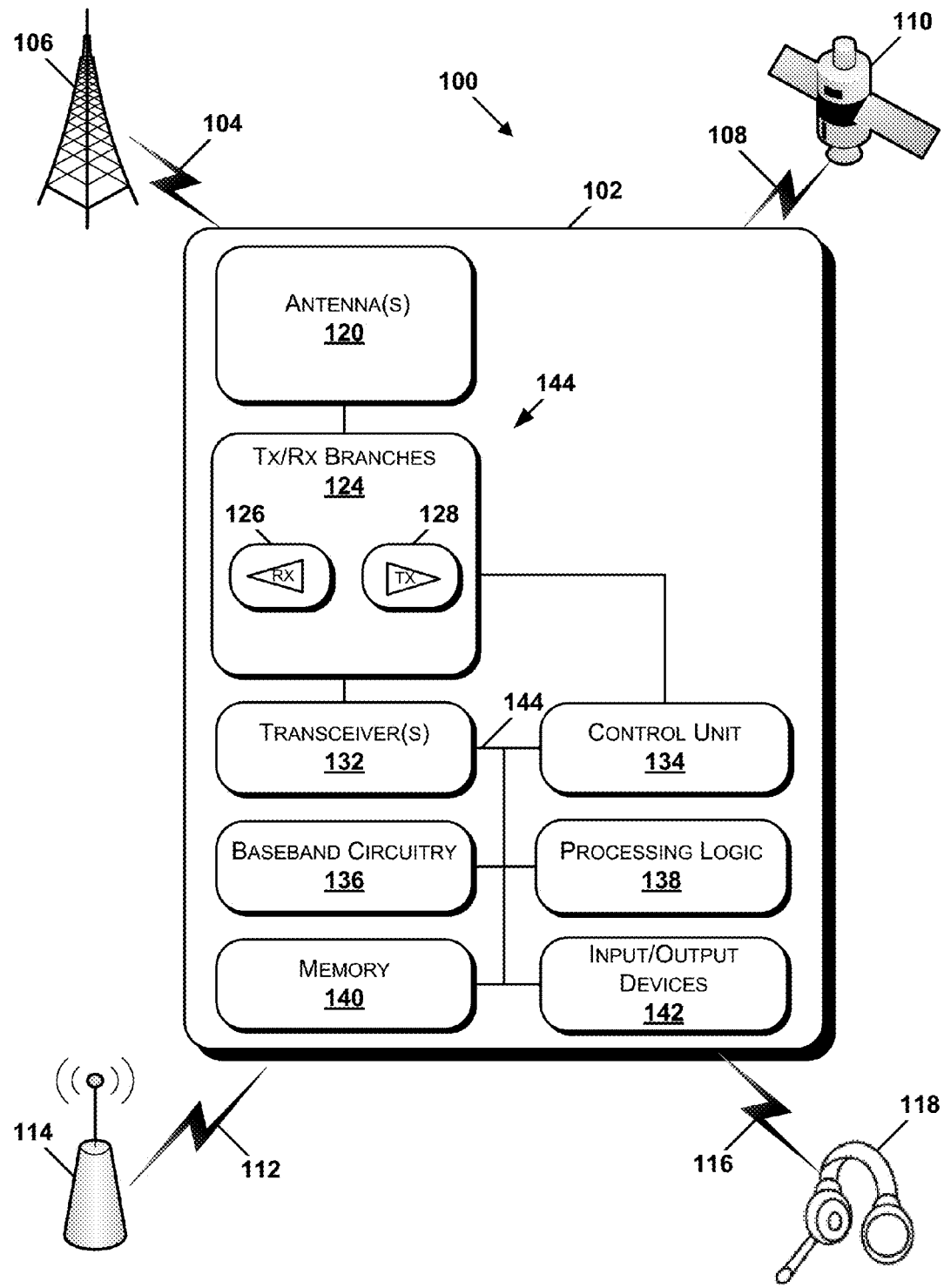
FIG. 1 shows an exemplary system that implements wireless communications using a plurality of wireless communications standards.

FIG. 1 shows an exemplary system 100 that implements wireless communications using a plurality of wireless communications standards. The system 100 includes a wireless communication device 102 that is configured to transmit wireless signals to, and receive wireless signals from one or more external devices. The wireless signals may include voice traffic, data, control information, or any combination thereof. The wireless communication device 102 may be implemented in any number of ways, including as a smart phone, a hand-held computing device (e.g., a personal digital assistant (PDA)), a mobile telephone, a media playing device, a portable gaming device, a personal computer, a laptop computer, another suitable wireless communication device, or any combination thereof.

In one implementation, the wireless communication device 102 may transmit and/or receive wireless signals 104 via a base station 106. The base station 106 may be included in a wide area wireless communication network, such as a GSM network, a UMTS network, a code division multiple access (CDMA) network, a high speed packet access (HSPA) network, a general packet radio service (GPRS) network, an enhanced data rates for GSM evolution (EDGE) network, a worldwide interoperability for microwave access (WiMAX) network, a time division multiple access (TDMA) network, a frequency division multiple access (FDMA) network, a long term evolution (LTE) network, an LTE-A network, or any combination thereof.

In another implementation, the wireless communication device 102 may transmit and/or receive wireless signals 108 via a communication satellite 110. Further, the wireless communication device 102 may transmit and/or receive wireless signals 112 via a wireless access point 114. The wireless access point 114 may be included in a wide area wireless network or a wireless local area network, such as a Bluetooth network or an Institute of Electrical and Electronics Engineers (IEEE) 802.11 protocol network, such as wireless local area network (WLAN) communications. Additionally, the wireless communication device 102 may transmit and/or receive wireless signals 116 via a headset 118, such as a Bluetooth headset.

In a particular implementation, the wireless communication device 102 includes one or more antennas 120. The antenna(s) 120 may be placed in various locations of the wireless communication device 102, such as a bottom portion or a top portion of the wireless communication device 102. In some implementations, the antenna(s) 120 may be very small, such as a microstrip antenna. For example, the antenna(s) 120 may include a planar inverted F antenna (PIFA) or a folded inverted conformal antenna (FICA). The size of the antenna(s) 120 may be reduced by coupling each of the antenna(s) 120 to a high permittivity dielectric substrate. Further, the size of the antenna(s) 120 may also be reduced by increasing the quality factor (Q) of the antenna(s) 120. For example, the quality factor of the antenna(s) 120 may be increased by lowering the building height of the antenna(s) 120. In another example, the quality factor of the antenna(s) 120 may be increased by adding ceramic materials to the antenna(s) 120.

Additionally, the antenna(s) 120 may cover a narrow band of frequencies at a given time. In particular, the band of frequencies covered by the antenna(s) 120 during a communication session may be less than the entire range of frequencies covered by signals transmitted and received according to a particular wireless communication technology. For example, the wireless communication device 102 may be configured to transmit signals according to the UMTS wireless communication technology in a range of 1920-1980 MHz. However, at any given time, the antenna(s) 120 may transmit signals within one or more channels having a range of 3.84 MHz each.

The frequency of signals received and transmitted by the antenna(s) 120 depends on a particular resonant frequency of the antenna(s) 120. In some implementations, the antenna(s) 120 are multi-band antennas that are tuned to different resonant frequencies. For example, a particular one of the antenna(s) 120 may be tuned to a first resonant frequency while receiving signals of a particular wireless communication technology and the particular antenna may be tuned to a second resonant frequency while transmitting signals of the particular wireless communication technology. Additionally, a particular one of the antenna(s) 120 may be tuned to resonant frequencies to send and receive signals via a first wireless communication technology during a first communication session, while during a second communication session the particular antenna is tuned to a different resonant frequencies to send and receive signals via a second wireless communication technology.

In addition, the wireless communication device 102 includes one or more transmitting and receiving (Tx/Rx) branches 124 coupled to the antenna(s) 120. The Tx/Rx branches 124 may include a number of components to process signals transmitted and received by the antenna(s) 120. For example, a receiving branch of the Tx/Rx branches 124 may include a receiving amplifier 126 and a transmitting branch of the Tx/Rx branches 124 may include a transmitting amplifier 128. The receiving amplifier 126 may be a low noise amplifier and the transmitting amplifier 128 may be a power amplifier. The Tx/Rx branches 124 may also include a number of additional components, such as one or more switches, one or more filters, such as duplex filters and high pass filters, or a combination thereof. In addition, each transmitting branch of the Tx/Rx branches 124 may include one or more additional power amplifiers. Further, each receiving branch of the Tx/Rx branches 124 may include one or more additional low noise amplifiers. The combination of the antenna(s) 120 and the Tx/Rx branches 124 may be generally considered as the front-end 144 of the wireless communication device 102.

The wireless communication device 102 also includes one or more transceiver(s) 132 that are configured to process signals to be transmitted and to process signals received via one or more respective wireless communication technologies. In some implementations, the receiving amplifier 126 and the transmitting amplifier 128 may be included in the transceivers 132 rather than the Tx/Rx branches 124.

In an illustrative implementation, each of the antenna(s) 120 is coupled to a respective transmitting branch, a respective receiving branch, or a combination thereof. For example, a particular one of the antenna(s) 120 may be coupled to a transmitting branch to transmit signals from a particular one of the transceiver(s) 132 to the external devices 106, 110, 114, 118. In another example, the particular antenna 120 may be coupled to a receiving branch to communicate signals received at the particular antenna 120 from the external devices 106, 110, 114, 118 to the particular transceiver 132. Further, the particular antenna 120 may be coupled to a combined branch to both communicate signals both to and from the particular transceiver 132.

The wireless communication device 102 includes a control unit 134. The control unit 134 may receive a number of inputs from baseband circuitry 136, as well as other sources. The baseband circuitry 136 may also provide the forward power at the antenna(s) 120 for signals transmitted to external devices and also the reflected power at the antenna(s) 120. Further, the baseband circuitry 162 may provide a use case, such as gaming, talk, handset, to the control unit 134 indicating possible influence of user interaction with the wireless communication device 102. Data from sensors indicating user interaction with certain parts of the wireless communication device 102 may also be provided to the control unit 134, as well as, current consumption. The control unit 134 may also receive a received signal strength indication (RSSI). The control unit 134 processes the inputs received from the baseband circuitry 136 and other sources to optimize the tuning of the impedances of the antenna(s) 120 and the receiving amplifier 126 and the transmitting amplifier 128.

The wireless communication device also includes additional components, such as processing logic 138 and memory 140. The processing logic 138 may include one or more processors and the memory 140 may be is accessible to the processing logic 138. The memory 140 may include read-only memory (ROM), random access memory (RAM), flash memory, a hard disk, or any combination thereof. Additionally, the memory 140 may store one or more applications configured to transmit and/or receive wireless signals. For example, the memory 140 may store an application configured to send and receive wireless signals related to telephone calls, such as voice traffic or control information. In another example, the memory 140 may store an application configured to request and receive website data, an application configured to transmit and receive text messages, an application configured to transmit and receive picture messages, an application configured to transmit and receive video messages, or any combination thereof. The applications stored in the memory 140 may include software instructions, hardware, or any combination thereof.

The wireless communication device 102 also includes one or more input/output devices 142. In an illustrative embodiment, the input/output devices 142 may include a microphone, a speaker, a touchpad display, a cursor control device, such as a mouse, a keypad, or any combination thereof. Additionally, the wireless communication device 102 includes a bus 144 to facilitate the communication of signals between components of the wireless communication device 102 and other components not shown, such as a power supply.

Figure 2:
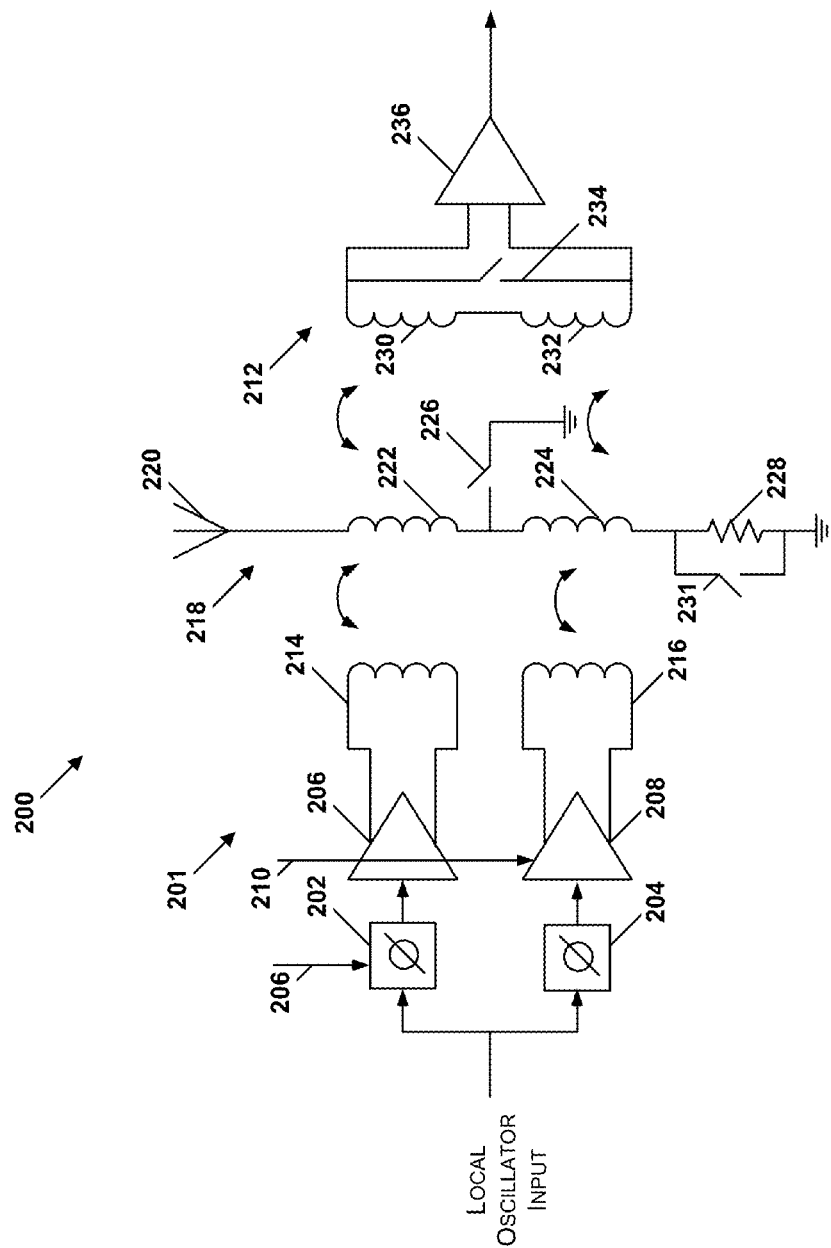
FIG. 2 illustrates a portion of a front-end associated with a wireless communications device.

FIG. 2 illustrates a portion of a front-end 200 (e.g. the front-end 144) associated with the wireless communications device 102. For example, front-end 200 may be associated with the TX/RX branches 124 and antennas 120. The front-end 200 is functional to receive a local oscillator input. The local oscillator input may be provided by the transceiver 132 and/or baseband circuitry 136.

The front-end 200 may include at least a programmable cancellation power amplification structure 201. As is illustrated, the amplification structure 201 may include two phase modification devices 202 and 204. In one implementation, the phase modification devices 202 and 204 are phase offset providing devices. For example, the phase modification device 202 may be programmed to offset the phase associated with a signal received thereby. Similarly, the phase modification device 204 may be programmed to offset the phase associated with the signal received thereby. In one particular example, the local oscillator signal received by the phase modification devices 202 and 204 is a high-frequency clock signal. Each of the phase modification devices 202 and 204 is capable of advancing or delaying the received high-frequency clock signal. A control signal 206 (only one shown for simplicity) may be provided to the phase modification devices 202 and 204 to cause the advancing or delaying of the received high-frequency clock signal. In one particular example, the control signal 206 causes the phase modification device 202 to advance the high-frequency clock signal and causes the phase modification device 204 to delay the high-frequency clock signal. Therefore, in one particular example, the high-frequency clock signal output by the phase modification device 202 may be an offset version (e.g. advanced or delayed in time) of the high-frequency clock signal output by the phase modification device 204.

Power amplifiers 206 and 208 are provided downstream from the phase modification devices 202 and 204. In particular, the phase modification device 202 is coupled to the power amplifier 206, and the phase modification device 204 is coupled to the power amplifier 208. The power amplifiers 206 and 208 are capable of amplifying signals received thereby.

In one particular example, the power amplifiers 206 and 208 may be digitally controlled. That is, a control signal 210, such as a control signal that carries a digital word, may be provided to one or both of the power amplifiers 206 and 208. For simplicity, only one of the power amplifiers 206 and 208, in particular the power amplifier 208, is shown to receive the control signal 210. However, it should be understood that both power amplifiers 206 and 208 may be digitally controlled. In one example, a digital control word may cause the power amplifier 208 to amplify the high-frequency clock signal received from the phase modification device 204. In one example, a larger digital control word may cause the power amplifier 208 to provide a higher amplification of the high-frequency clock signal received from the phase modification device 204. In another example, a smaller digital control word may cause the power amplifier 208 to provide a smaller amplification of the frequency clock signal received from the phase modification device 208. The control word carried by the control signal 210 may also cause the power amplifier 208 to reduce an amplitude associated with the high-frequency clock signal received thereby.

Ideally, the power amplifiers 206 and 208, assuming they are programmed as such, would provide equal amplification to the signals received thereby. However, over time or due to manufacturing tolerances, the power amplifiers 206 and 208 may not provide equal signal amplification. Therefore, in one implementation, the control signal 210 may be received by at least one of the power amplifiers 206 and 208 to ensure that both power amplifiers 206 and 208 are providing substantially equal or equal programmed signal amplification. That is, it may be desirable to ensure that manufacturing tolerances associated with the power amplifiers 206 and 208 do not cause distinct power amplification provided by the power amplifiers 206 and 208. The control signal 210 is functional to modify the power amplification provided by at least one of the power amplifiers 206 and 208 in order to ensure that each of the power amplifiers 206 and 208 are providing the same or substantially the same power amplification. In one implementation, a receiving structure or arrangement 212 (described in greater detail later) is provided to at least provide feedback information that enables proper setting of the control signal 210 to ensure that the power amplifiers 206 and 208 are providing substantially equal or equal signal amplification.

The amplification structure 201 may also include inductors 214 and 216. In general, the term inductor used herein may be any structure that provides an inductance (e.g., a coil). The inductor 214 is to receive a signal that is amplified by the power amplifier 206. The inductor 216 is to receive a signal that is amplified by the power amplifier 208. The inductor 214 is capable of inductively conveying a signal received thereby. Similarly, the inductor 216 is capable of inductively conveying a signal received thereby. In general, the inductors or inductances described herein are capable of inductively receiving and conveying signals.

The front-end 200 may also include a signal combining transformer 218. The combining transformer 218 may include an antenna structure 220 that is coupled to series coupled inductors 222 and 224. The series coupled inductors 222 and 224 may be center tapped by a switch 226 that is coupled to ground. A resistance or resistor 228 may be coupled between ground and the inductor 224. A switch 231 may be coupled in parallel with the resistor 228.

As indicated hereinabove, the front-end 200 may also include the receiving structure 212. The receiving structure 212 may include series coupled inductors 230 and 232. The inductor 230 is to receive signals conveyed by the inductor 222, and the inductor 232 is to receive signals conveyed by the inductor 224. A switch 234 may be coupled in parallel with the inductors 230 and 232. An amplifier 236, such as a low noise amplifier (LNA) is positioned downstream of the inductors 230 and 232. The amplifier 236 may be coupled to various circuit elements including, for example, a mixer, an analog-to-digital converter (ADC) and/or the baseband circuitry 136.

Exemplary Function of Structure

The front-end 200 of the wireless communication device 100 is capable of a number of different operational functionalities. Foremost, the front-end 200 is capable of receiving and transmitting signals according to different wireless standards. For example, the front-end 200 may transmit and receive Bluetooth signals. In another example, the front-end 200 may transmit and receive WLAN signals. In yet another example, the front-end 200 may transmit Bluetooth signals and receive WLAN signals and vice versa. Furthermore, the front-end 200 is capable of receiving and transmitting Bluetooth and WLAN signals concurrently.

Transmitting and receiving signals concurrently by the front-end 200 is achieved in the following manner. The switch 226 is closed, and the switch 231 is opened. The power amplifiers 206 and 208 each provide a desired amplified signal. The amplified signal provided by the power amplifier 206 is offset in phase compared to the amplified signal provided by the power amplifier 208. The phase offset is caused by the control signal 206 received by the phase modification device 202. The amplified and phase offset signals provided by the power amplifiers 206 and 208, via the inductors 214 and 216, are received by the combining transformer 218. Half of the amplified and phase offset signals provided by the power amplifiers 206 and 208 is transmitted by the antenna 220. Ideally, the other half of the amplified and phase offset signals provided by the power amplifiers 206 and 208 is absorbed by the resistor 228. Preferably, the resistor 228 has the same or substantially the same impedance as the antenna 220.

During transmit and receive of signals concurrently, the switch 234 of the receiving structure 212 is left in an open state. Therefore, the inductors 230 and 232 are capable of receiving signals provided by the antenna 220. Those receive signals are conveyed downstream to the LNA 236 and beyond for further processing. In the event that the LNA 236 and/or the baseband circuitry 136 detects undesirable signal leakage from the power amplifiers 206 and 208 during a transmit and receive concurrent operation, the LNA 236 and/or baseband circuitry 136, or other suitable functional element, may generate a digital control word, which is carried on the digital signal 210, that adjusts at least one or both of the power amplifiers 206 and 208 such that the transmit signal power provided by the power amplifiers 206 and 208 are the same or substantially the same. The amplitude adjustment of one or more the power amplifiers 206 and 208, by way of the digital control word provided by the digital signal 210, is designed to eliminate any transmit signal leakage that is detected by the LNA 236 and/or baseband circuitry 136.

Transmit only (i.e., no receive by the antenna 220) by the front end 200 is achieved in the following manner. The switch 226 is caused to be opened, and the switch 231 is caused to be closed. Furthermore, the switch 234 is closed thereby protecting the LNA 236 from the transmit signals provided by the power amplifiers 206 and 208. The power amplifiers 206 and 208 each provide amplified signals in phase. That is, each high-frequency clock signal provided by phase modification devices 202 and 204, respectively, are in phase. In the operational state of transmit only of the front end 200, there is no signal loss into the resistor 228. More particularly, the amplified signals provided by the power amplifiers 206 and 208 are combined and transmitted by the antenna 220.

Receive only (i.e., no transmit signals provided by the power amplifiers 206 and 208) by the front end 200 is achieved in the following manner. The switch 226 is caused to be opened, and the switch 231 is caused the closed. Furthermore, the switch 234 is opened thereby allowing the LNA 236 to receive signals from the antenna 220 via the inductors 230 and 232. The power amplifiers 206 and 208 are switched off during the receive only mode of the front end 200.

Figure 3:
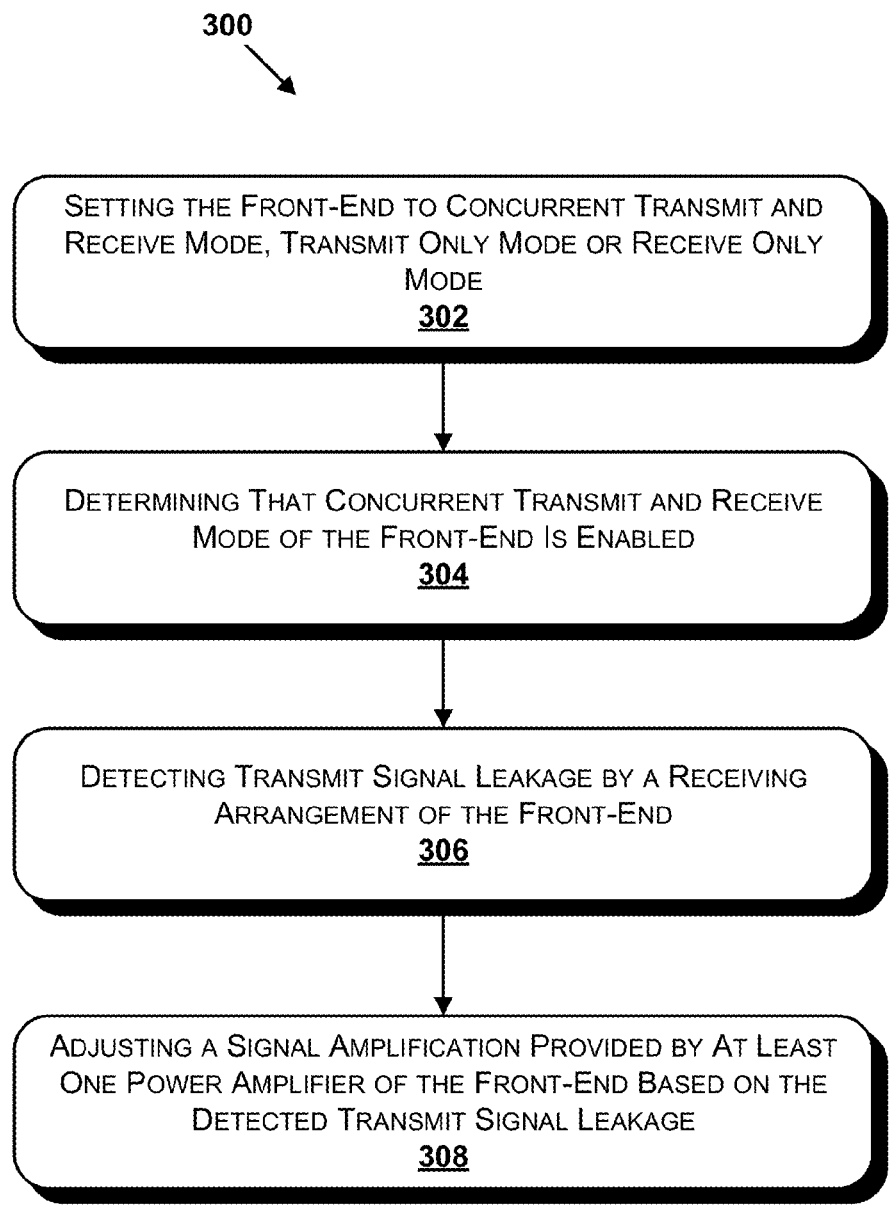
FIG. 3 shows a flowchart of a method to provide switchable concurrent transmit and receive, transmit only and receive only

FIG. 3 shows a flowchart of a method 300 to provide switchable concurrent transmit and receive, transmit only and receive only. The method 300 may be implemented utilizing the system 100 shown in FIG. 1 and front-end illustrated in FIG. 2.

Specifics of an exemplary method are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable storage media. The computer-readable storage media can be any available media that can be accessed by a computing device to implement the instructions stored thereon.

The method 300 begins at 302 with setting the front end 200 to concurrent transmit and receive mode, transmit only mode or receive only mode. At 304, it is determined that concurrent transmit and receive mode of the front end 200 is enabled.

At 306, transmit signal leakage is detected by a receiving arrangement associated with the front end 200. At 308, the front end 200 adjusts a signal amplification provided by at least one power amplifier based on the detected transmit signal leakage.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A wireless communication device, comprising:
an amplification structure including a first amplification element and a second amplification element;
a processor coupled to provide a control signal to the amplification structure, the control signal to adjust an amount of signal amplification provided by at least one of the first and second amplification elements;
a receiving structure coupled to the amplification structure, the receiving structure to receive at least one antenna signal provided by an antenna and to provide feedback information to influence the control signal;
further comprising at least one phase modification device coupled to the amplification structure, the at least one phase modification device to receive a frequency signal and to offset a phase associated with the frequency signal to provide a phase modified frequency signal to the amplification structure; and
wherein the at least one phase modification device is a plurality of phase modification devices, each of the plurality of phase modification devices to receive the frequency signal and to offset the phase associated with the frequency signal to provide the phase modified frequency signal to the amplification structure.

2. The wireless communication device of claim 1, wherein the control signal causes the signal amplification provided by the at least one of the first and second amplification elements to be the same or substantially the same as a signal amplification provided by the other of the at least one of the first and second amplification elements.

3. The wireless communication device of claim 1, wherein the control signal is provided to only one of the first amplification element and the second amplification element.

4. The wireless communication device of claim 1, wherein the control signal is provided to at least one of the first amplification element and the second amplification element to cause a first signal amplification provided by the first application element and a second signal amplification provided by the second amplification element to be substantially equal.

5. The wireless communication device of claim 1, further comprising at least one inductance coupled to the amplification structure, the at least one inductance to convey signals provided by the amplification structure to the receiving structure.

6. The wireless communication device of claim 1, further comprising a signal combining transformer inductively coupled to the amplification structure, the signal combining transformer including the antenna coupled to at least two series coupled inductances, the at least two series coupled inductances being center tapped by a first switch, and at least one of the at least two series coupled inductances coupled to an inductance having a second switch coupled in parallel therewith.

7. A wireless communication device, comprising:
an amplification structure;
a signal combining structure coupled to the amplification structure, the signal combining structure including an antenna and an inductance element to receive at least one amplified signal from the amplification structure; and
a receiving structure coupled to the signal combining structure, the receiving structure to receive at least one antenna signal provided by the antenna,
wherein the signal combining structure enables the wireless communication device to receive and transmit wireless signals concurrently, receive wireless signals only, and transmit wireless signals only, and
wherein the signal combining structure includes first and second inductance elements coupled to the antenna, the first and second inductance elements being center tapped by a first switch, the second inductance element being coupled to an impedance coupled in parallel to a second switch.

8. The wireless communication device according to claim 7, wherein the first switch is caused to be closed and the second switch is caused to be opened to receive and transmit the wireless signals concurrently.

9. The wireless communication device according to claim 7, wherein the first switch is caused to be closed and the second switch is caused to be closed to transmit wireless signals only.

10. The wireless communication device according to claim 7, wherein the first switch is caused to be opened and the second switch is caused to be closed to receive wireless signals only.

11. A method; comprising:
configuring a wireless communication device to a concurrent transmit and receive mode;
determining that at least a portion of a signal for transmission has been undesirably received by a receiving structure of the wireless communication device; and
adjusting a signal amplification provided by the wireless communication device to mitigate receiving the portion of the signal for transmission at the receiving structure of the wireless communication device;
wherein the configuring includes simultaneously opening a first switch of a signal combining structure and closing a second switch of the signal combining structure, the signal combining structure including first and second inductance elements coupled to an antenna, the first and second inductance elements being center tapped by the first switch, the second inductance element being coupled to an impedance coupled in parallel to the second switch.

12. The method according to claim 11, wherein the act of adjusting a signal amplification provided by the wireless communication device includes generating a control signal that is received by an amplification structure of the wireless communication device, the control signal to adjust a signal amplification provided by the application structure.

13. The method according to claim 12, wherein the control signal comprises a digital control word.

14. The method according to claim 11, wherein the signal amplification is provided by at least two amplification elements of the wireless communication device, and the act of adjusting the signal amplification includes generating a control signal that is received by only one of the at least two amplification elements.

15. The method according to claim 11, wherein the act of determining is performed by at least one of a low noise amplifier and a baseband processor of the wireless communication device.

16. A wireless communication device, comprising:
an amplification structure including a first amplification element and a second amplification element;
a processor coupled to provide a control signal to the amplification structure, the control signal to adjust an amount of signal amplification provided by at least one of the first and second amplification elements; and
a signal combining transformer inductively coupled to the amplification structure, the signal combining transformer including an antenna coupled to at least two series coupled inductances, the at least two series coupled inductances being center tapped by a first switch, and at least one of the at least two series coupled inductances coupled to an inductance having a second switch coupled in parallel therewith.

17. A wireless communication device, comprising:
an amplification structure;
a signal combining structure coupled to the amplification structure, the signal combining structure including an antenna and an inductance element to receive at least one amplified signal from the amplification structure; and
a receiving structure coupled to the signal combining structure, the receiving structure to receive at least one antenna signal provided by the antenna,
wherein the signal combining structure enables the wireless communication device to receive and transmit wireless signals concurrently, receive wireless signals only, and transmit wireless signals only, and
wherein the receiving structure includes at least two series coupled inductances and a third switch coupled in parallel with the two series coupled inductances, the third switch configured to (1) be in an open state to enable the wireless communication device to receive and transmit wireless signals concurrently, (2) be in a closed state to enable the wireless communication device to transmit wireless signals only, (3) be in an open state to enable the wireless communication device to receive wireless signals only.

* * * * *

UNITED STATES PATENT AND TRADEMARK OFFICE
CERTIFICATE OF CORRECTION

PATENT NO. : 9,544,002 B2
APPLICATION NO. : 14/156674
DATED : January 10, 2017
INVENTOR(S) : Jann et al.

Page 1 of 1

It is certified that error appears in the above-identified patent and that said Letters Patent is hereby corrected as shown below:

In the Claims

In Column 9, Line 16, in Claim 11, delete "method;" and insert --method,-- therefor Signed and Sealed this
Twenty-eighth Day of May, 2019

Andrei Iancu
*Director of the United States Patent and Trademark Office*